US008822900B2

(12) United States Patent
Richardson et al.

(10) Patent No.: US 8,822,900 B2
(45) Date of Patent: Sep. 2, 2014

(54) MULTI-MODE PHOTODETECTOR

(75) Inventors: Justin Richardson, Edinburgh (GB);
Robert Henderson, Edinburgh (GB)

(73) Assignee: STMicroelectronics (Research & Development) Limited, Marlow, Buckinghamshire (GB)

( * ) Notice: Subject to any disclaimer, the term of this patent is extended or adjusted under 35 U.S.C. 154(b) by 294 days.

(21) Appl. No.: 13/368,473

(22) Filed: Feb. 8, 2012

(65) Prior Publication Data

US 2012/0205522 A1 Aug. 16, 2012

(30) Foreign Application Priority Data

Feb. 10, 2011 (GB) .................................. 1102380.1

(51) Int. Cl.
| | | |
|---|---|---|
| *H03F 3/08* | (2006.01) | |
| *H04N 5/355* | (2011.01) | |
| *H04N 5/378* | (2011.01) | |
| *H04N 5/374* | (2011.01) | |

(52) U.S. Cl.
CPC ............... *H04N 5/374* (2013.01); *H04N 5/355* (2013.01); *H04N 5/378* (2013.01)
USPC ................................................ 250/214 AG

(58) Field of Classification Search
USPC ................. 250/214.1, 214 AG; 257/184, 186, 257/295–297, 438
See application file for complete search history.

(56) References Cited

U.S. PATENT DOCUMENTS

| | | | |
|---|---|---|---|
| 2010/0019295 A1* | 1/2010 | Henderson et al. | ........... 257/292 |
| 2010/0214654 A1 | 8/2010 | Birk et al. | |
| 2010/0245809 A1* | 9/2010 | Andreou et al. | .............. 356/222 |

FOREIGN PATENT DOCUMENTS

| | | |
|---|---|---|
| WO | WO-2004027879 A2 | 4/2004 |
| WO | WO-2008121072 A1 | 10/2008 |
| WO | WO-2011026942 A2 | 3/2011 |

OTHER PUBLICATIONS

A. Rochas, G. Ribordy, B. Furrer, P. A. Besse, and R. S. Popovic, "First Passively-Quenched Single Photon Counting Avalanche Photodiode Element Integrated in a Conventional CMOS Process with 32 ns Dead Time", Proceedings of SPIE vol. 4833, p. 107, 2002.*
UK Search Report for GB1102380.1 dated Jun. 9, 2011 (1 page).

* cited by examiner

*Primary Examiner* — Thanh Luu
*Assistant Examiner* — Renee D Chavez
(74) *Attorney, Agent, or Firm* — Gardere Wynne Sewell LLP (57) ABSTRACT

A photodetector includes a photodiode and output circuitry coupled to the photodiode. The photodetector is configurable for operation in at least two modes. A first configurable mode operates the photodetector as an integrating sensor. In this first mode, a bias voltage across the photodiode is set below the breakdown voltage of the photodiode and the output circuitry is configured to read an analog integration output voltage from the photodiode. A second configurable mode operates the photodetector as a single photon avalanche detector. In this second mode, the bias voltage across the photodiode is set above the breakdown voltage of the photodiode and the output circuitry is configured to read an avalanche output voltage.

30 Claims, 7 Drawing Sheets

MULTI-MODE PHOTODETECTOR

PRIORITY CLAIM

This application claims priority from United Kingdom Application for Patent No. 1102380.1 filed Feb. 10, 2011, the disclosure of which is hereby incorporated by reference.

TECHNICAL FIELD

The present invention relates to photodetectors and imaging devices, and in particular to single photon avalanche diodes (SPADS) and active pixel integrating sensors.

BACKGROUND

Since the first implementations of single photon avalanche diodes (SPADs), these devices have established themselves as the detectors of choice in multiple time-correlated imaging methods such as fluorescence lifetime imaging and 3D imaging. For fabricating large arrays of SPADs and to allow for sufficient timing electronics to be integrated on pixel or array level, deep-submicron CMOS technology has been used.

The core of a CMOS SPAD consists of a p-n junction biased above its breakdown voltage, thus operating in Geiger mode. In this regime of operation, free carriers, such as photogenerated electron-hole pairs, can trigger an avalanche breakdown by impact ionization. To avoid premature edge breakdown, a guard ring has been implemented for limiting the electric field at the edges of the junction. SPAD photodiodes have an extremely large gain as a single electron causes a flow of charge (electron-hole pairs) proportional to the full-well capacitance and excess bias voltage of the photodiode. This typically will be in the range of tens to hundreds of thousands. The extremely large gain renders subsequent noise due to electronic processing insignificant. A single digital pulse is emitted for each absorbed photon with a timing accuracy of the order of tens to hundreds of picoseconds. These pulses can be counted or precisely timed to achieve ultra-low light imaging or time-resolved imaging. There are many applications in microscopy, range-sensing, biosensing or biomedical imaging.

Avalanche photodiodes (APDs) operate with the p-n junction biased just below its breakdown voltage. Compared to a Geiger-mode SPAD, an APD provides a finite optical gain, creating multiple electron hole pairs from incident photons. The gain is a nonlinear function of the applied bias voltage. The generated (amplified) photocurrent can be integrated on the APD capacitance to provide a measure of the light intensity as a voltage swing. This voltage suffers from excess noise due to the stochastic nature of the avalanche process.

CMOS image sensors (CIS) commonly employ active pixels composed of a photodiode biased far below breakdown and transistors for charge transfer, buffering, row-addressing and pixel reset. In the CIS case there is no multiplication of the incident light in terms of photo-generated charge; one absorbed photon creates a single electron-hole pair. The generated photocurrent can be integrated on the photodiode capacitance to provide a measure of the light intensity as a voltage swing. CIS is now the dominant technology behind modern digital cameras, having taken over large sectors of the market from CCD.

In other approaches, each of these types of operation, SPAD, APD and CIS, have required specially tailored pixels. There is a need to use the modes of operation of SPAD, APD and CIS in a single imaging application in order to adapt the gain of the photodetector to the intensity of the incoming light to avoid saturation. Therefore, a photodetector and readout circuit which can be reconfigured is desirable in cameras that provide improved cost, simplicity, flexibility and speed of analysis.

SUMMARY

According to a first aspect, a photodetector comprises: a photodiode; a bias terminal operable to receive an excess bias voltage and to set a bias voltage across the photodiode; reset circuitry operable to control the bias voltage; and output circuitry operable to read a voltage that depends on photons incident on the photodiode. The photodetector is operable in a first mode as an integrating sensor with the bias voltage being set below the breakdown voltage of the photodiode and with the output circuitry operable to read an analog integration output voltage from the photodiode. The photodetector is further operable in a second mode as a single photon avalanche detector with the bias voltage being set above the breakdown voltage of the photodiode and with the output circuitry operable to read an avalanche output voltage.

Preferably, the avalanche output voltage comprises a digital avalanche output voltage indicating an avalanche of the photodiode.

Preferably, the photodetector further comprises digital output circuitry operable, in the second mode, to buffer the digital avalanche output voltage.

Preferably, the avalanche output voltage comprises an analog avalanche output voltage responsive to timing of avalanches of the photodiode.

Preferably, the photodetector further comprises a current source and a capacitor and wherein, in the second mode, the analog avalanche output voltage is read from the capacitor.

Preferably, the analog avalanche output voltage is proportional to a time interval between a clock signal and an avalanche of the photodiode.

Preferably, the analog avalanche output voltage is proportional to a count of avalanches of the photodiode in a set time interval.

Preferably, the output circuitry comprises separate circuitry to read the integration output voltage from the photodiode in the first mode and to read the analog avalanche output voltage in the second mode.

Preferably, the output circuitry comprises shared circuitry both to read the integration output voltage from the photodiode in the first mode and to read the analog avalanche output voltage in the second mode.

Preferably, in the first mode, the reset circuitry is operable as a switch to reset the bias voltage after an integration period.

Preferably, in the second mode, the reset circuitry is operable as a switch to actively quench an avalanche by reducing the bias voltage to below the breakdown voltage.

Preferably, in the second mode, the reset circuitry is further operable to arm the photodiode by resetting the bias voltage above the breakdown voltage.

Preferably, in the second mode, the reset circuitry is operable as a load to passively quench an avalanche by reducing the bias voltage to below the breakdown voltage.

Preferably, the reset circuitry is a transistor.

Preferably, at least part of the output circuitry is coupled to the photodiode and operable in the first mode as a source follower to read the integration output voltage from the photodiode and operable in the second mode as a gate to produce the avalanche output voltage.

According to another aspect, an imaging device comprises: a memory; a processor; and an image sensor coupled to at least one of the memory and processor. The image sensor comprises a plurality of photodetectors as described above.

Preferably, the memory, the processor and the imaging sensor are supported by a housing of a camera.

BRIEF DESCRIPTION OF THE DRAWINGS

The present invention will now be described, by way of example only, with reference to the accompanying drawings, in which.

DETAILED DESCRIPTION OF THE DRAWINGS

An example embodiment provides two, three or four imaging modalities combined into a single, configurable, multi-mode pixel having:

a normal integrating pixel mode and/or an avalanche photodiode mode which has photoelectric gain; and a SPAD Time to Analog Converter (TAC) mode for time correlated imaging and/or a SPAD Single Photon Counting (SPC) mode.

This pixel contains a single photodiode whose mode of operation depends on the level of bias voltage applied and readout circuitry to process the different types of signal from the photodiode encountered each mode of operation.

The embodiment may be an NMOS-only pixel which can be configured in Geiger mode as a SPAD, as an APD and in a normal CMOS Image Sensor (CIS) integrating mode.

Figure 1:
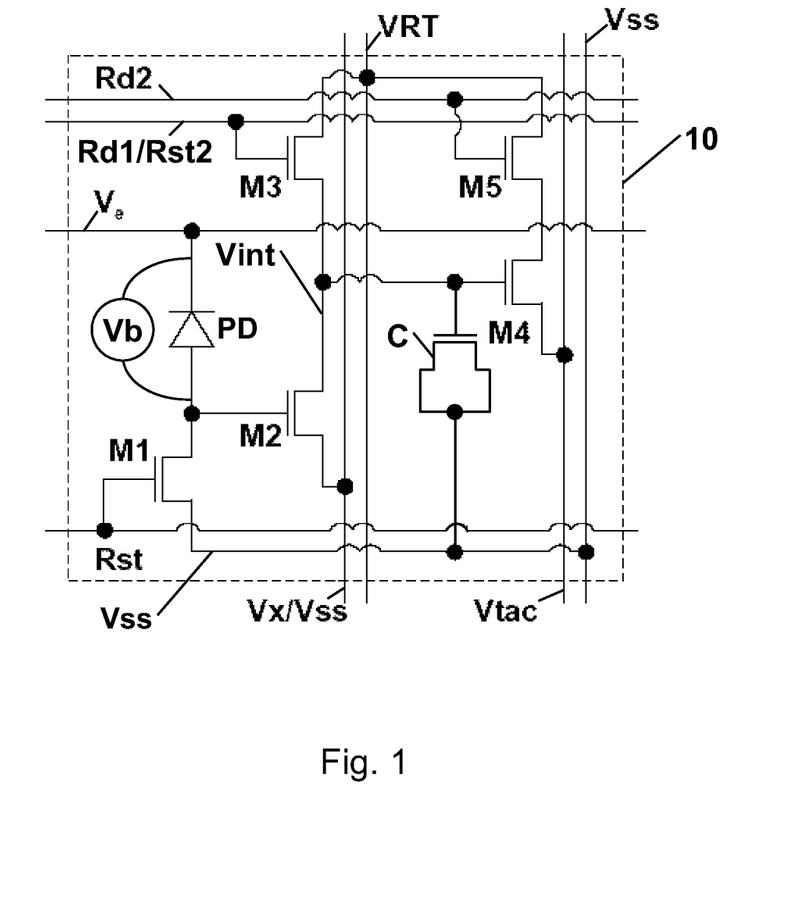
FIG. 1 shows an NMOS only Geiger/avalanche/integrating TAC photodetector pixel in accordance with an embodiment.

With reference to FIG. 1, a photodetector 10 is shown having a photodiode PD and a bias terminal that receives an excess bias voltage (Ve) and sets a bias voltage (Vb) across the photodiode (PD). Vb is equal to Ve if the cathode is set to ground. Reset circuitry, in this embodiment a transistor M1, also sets the bias voltage to ground Vss at the cathode of the photodiode PD. Output circuitry (M2/M3, M4/M5) is operable as source follower when combined with column current sinks (not shown) to read voltages that depend on the number of photons incident on the photodiode (PD). The photodetector 10 is operable in a first mode as an integrating sensor with the bias voltage Vb being set below the breakdown voltage of the photodiode PD and with the output circuitry (M2/M3) operable to read an analog integration output voltage from the photodiode (PD). The reset transistor M1 is operable as a switch to reset the bias voltage Vb below the breakdown voltage after an integration period.

The photodetector 10 is also operable in a second mode as a single photon avalanche detector (SPAD) with the bias voltage Vb being set above the breakdown voltage of the photodiode PD and with the output circuitry operable to read an avalanche output voltage. The avalanche output voltage may be analog, measured by M4/M5 and responsive to timing of avalanches, or digital, indicating an avalanche of the photodiode. Reset circuitry M1 is operable to passively or actively quench an avalanche of the photodiode PD by reducing the bias voltage Vb below the breakdown voltage. To actively quench an avalanche the reset transistor M1 is operated as a switch to arm the photodiode PD by resetting the bias voltage Vb above the breakdown voltage. In this mode the voltage on the gate of M1 is pulsed briefly to a high state. Alternatively, in the second mode, the reset transistor M1 is operable as a load to passively quench the avalanche by resistively reducing the bias voltage Vb to below the breakdown voltage of the photodiode PD. In this mode a fixed bias voltage is applied to the gate of M1.

A source follower transistor M2 is coupled to the photodiode PD and operable to read an output voltage. Part of the output circuitry (transistor M2) is coupled to the photodiode PD and is operable in the first mode as a source follower to read an output voltage from the photodiode PD and is operable in the second mode as a gate to signal the detection of the avalanche in the photodiode PD so as to produce the avalanche output voltage.

Integrating Mode

Figure 2:
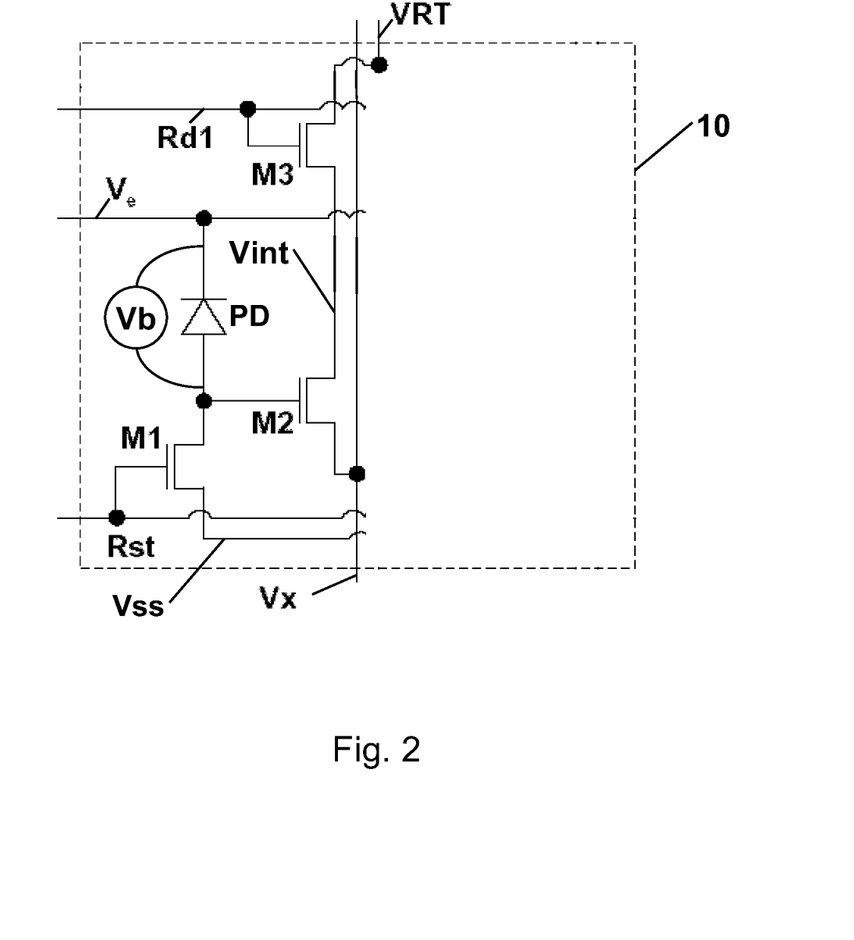
FIG. 2 shows the operating components of the photodetector pixel shown in FIG. 1 when in an integrating mode in accordance with an embodiment.
Figure 3:
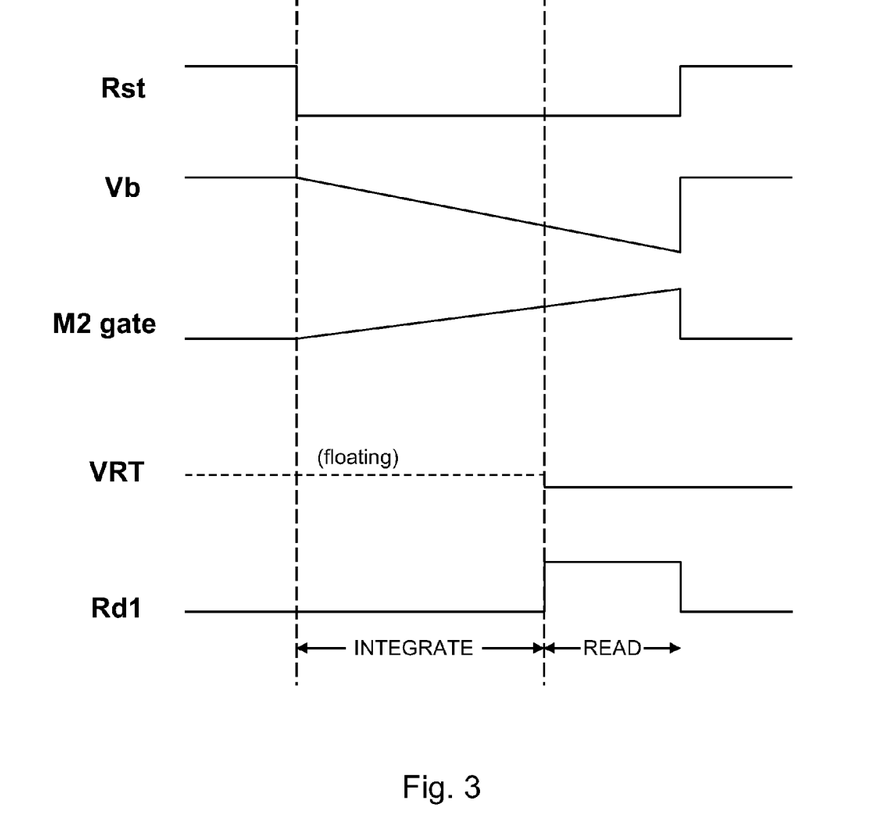
FIG. 3 is a timing diagram of the photodetector pixel shown in FIG. 1 when in an integrating mode in accordance with an embodiment.

FIG. 1 shows the photodetector pixel and FIG. 2 shows the operating components of the photodetector pixel shown in FIG. 1 in an integrating mode, such as a CMOS Integrating Sensor (CIS) mode. FIG. 3 is a timing diagram of the photodetector pixel shown in FIG. 1 when in an integrating mode in accordance with an embodiment, corresponding to FIG. 2.

With reference to FIGS. 1, 2 and 3, in the integrating mode, Ve is 3.3V or there about and as photocurrent (and/or dark current) is generated in the photodiode the pixel integrates the current and the voltage on the gate of M2 moves upwards from Vss once Rst goes low and turns off the switch M1. The output voltage of the pixel is read out on M2 at the line labeled Vx. M3 is the row read transistor, used when selecting successive rows of an array of such pixels. Vx is a 'bitline' and this node is connected to a column-wise current sink in order for M2 to act as a source follower. Typically the current sink is instantiated on a column-wise basis in an array of such pixels. M2 thus acts as a source follower with Rd1/Rst2 (Rd1 in FIG. 2) as the row enable (Rd1 denotes read in the first mode) and M3 is the output select transistor. The M4/M5 source follower is not used in this mode.

In this mode, Vx is the output and goes to an external (to the array) analog to digital converter (ADC). Vint is merely an intermediate node. RST goes high after the READ operation is finished. Rd1 stays high for a period of time to permit sample/hold at the front end of the ADC.

Avalanche Photodiode (APD) Mode

In APD mode, Ve is taken to a voltage below but approaching the breakdown knee of the diode where photoelectric gain is evident. The readout mechanism is the same as in integrating mode. Because the pixel is fabricated to operate with high voltages for the SPAD operation, for example using a guard ring, then the pixel can readily operate at the relatively high voltages required for the APD mode.

SPAD Time to Analog Converter (TAC) Mode

Figure 4:
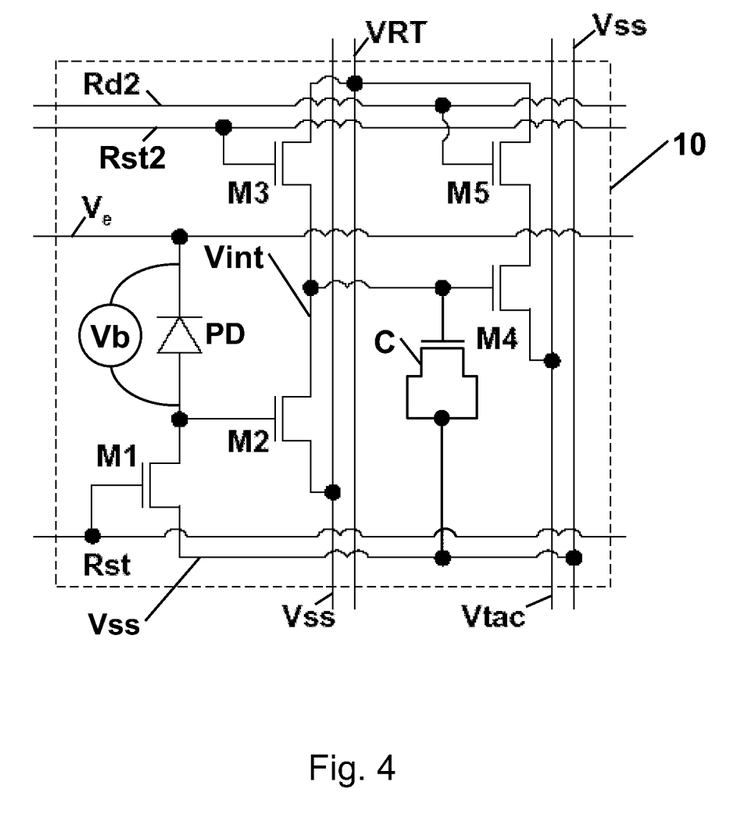
FIG. 4 shows the operating components of the photodetector pixel shown in FIG. 1 when in a SPAD mode in accordance with an embodiment.

FIG. 4 shows the operating components of the detector pixel shown in FIG. 1 in SPAD TAC mode. The difference between FIGS. 1 and 4 is that in FIG. 4, the labeling of Rd1/Rst2 and Vx/Vss are replaced with Rst2 and Vss respectively. In TAC mode, the detector acts as a SPAD with Ve set to a voltage equal to the breakdown voltage of the diode plus an excess bias level. The source of transistor M2 is set to 0V, i.e. Vss. To operate as a SPAD, the detector pixel has a guard ring and a circular active region.

Figure 5:
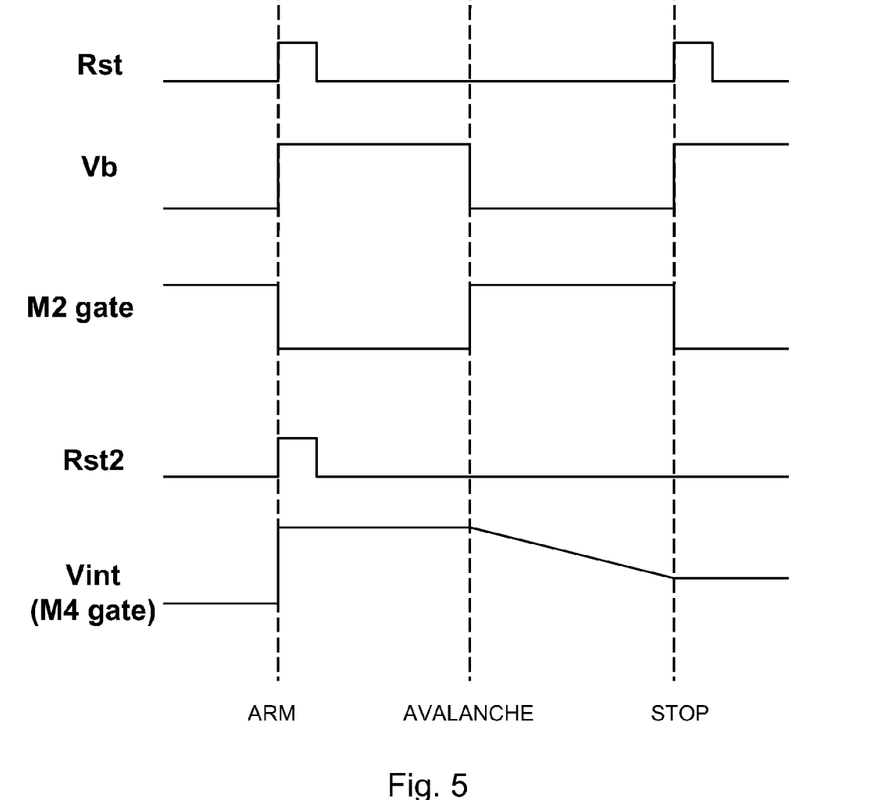
FIG. 5 is a timing diagram of the photodetector pixel shown in FIG. 1 when in a SPAD TAC mode in accordance with an embodiment.

FIG. 5 is a timing diagram of the detector pixel shown in FIG. 1 when in a SPAD TAC mode in accordance with an embodiment, corresponding to FIG. 4.

In this mode M1 acts as an armed mode passive quench component. The SPAD moving node (M2 gate) is reset low by Rst being driven high (ARM) and turning on the switch M1, so applying Vss to the photodiode PD and the gate of M2. The Rd1/Rst2 line (Rst2 in FIG. 4) is pulsed high at the same time as Rst so the TAC capacitor C at the gate of M4 (Vint) is charged to VRT (Voltage Reference, Top). Capacitor C is typically a combination of the gate capacitance of M4 and the routing capacitance of the local metallization used for interconnect.

When the SPAD fires (AVALANCHE), by the detection of a photon (or by dark current), the drain of M1 at the gate of M2 goes high and starts M2 integrating as a current source. The current source then ramps the voltage Vint at the gate of M4 downwards from VRT.

A stop signal is then issued by pulsing Rst high again. The gate of M2 then goes to 0V, i.e. Vss, and as M2 is turned off, the integration stops.

The voltage on the capacitor C is then represents the time from the SPAD event to the rising edge of Rst. This voltage can be read out via the M4/M5 source follower in the same way as conventional pixel arrays. M2/M3 are used to read out Vint in the integrating (first) mode and M4/M5 are used to read out Vint in the (second) SPAD. In integrating mode, M2 and M3 act as source follower and read transistors respectively. This is because the photodiode is acting differently in each of the modes. The photodiode's output 'waveform' is of a different form dependent on the bias conditions and extra circuitry is required to implement the more complex functionality of the TAC mode. In TAC mode M2 and M3 act as a logic gate (simple inverter), which stimulates the time to analog conversion of C, M4 and M5. An external analog to digital converter (ADC) is used in both the integrating and SPAD modes.

SPAD Single Photon Counting (SPC) Mode

Figure 6:
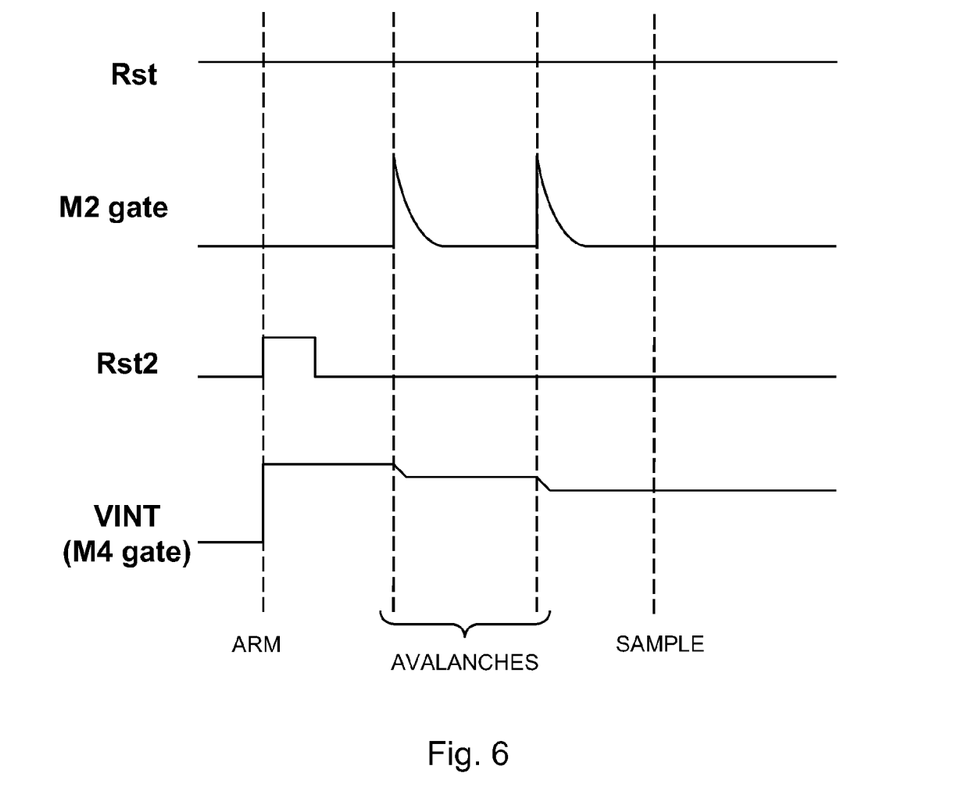
FIG. 6 is a timing diagram of the photodetector pixel shown in FIG. 1 when in a SPAD single pixel counting mode in accordance with an embodiment.

FIG. 6 is a timing diagram of the detector pixel shown in FIG. 1 when in a SPAD single pixel counting mode in accordance with an embodiment.

In this mode M1 is biased as a passive quench component. Instead of the voltage on the capacitor Vint ramping down from VRT linearly after the SPAD has fired, the passive quenching quickly resets the photodiode, so that the voltage Vint decreases stepwise, each voltage step corresponding to a single photon being detected (AVALANCHES). RST2 is pulsed to charge C. Every photon arrival subtracts a charge packet from C. Vtac then can be analog to digital converted (SAMPLE) to represent the digital version, via source follower M4.

Alternatively, Rd1 is set high (=RST2). M2 and M3 act like an NMOS only inverter and Vx has a pull-down resistor. When M2 is switched on, Vx is pulled high and single pulses are seen on Vx.

Embodiments accordingly provide:

1. A first mode to create and read out a variable positive analog voltage on the anode of the photodiode (drain of M1). This voltage is proportional to light intensity after a given exposure time (between pulses of Rst). This is valid for APD or CIS mode but not useful for SPAD mode.

2. A second mode where the pixel is to be operated in SPAD mode. In this mode, there may be means to:

(1) Register and readout that a single photon has been detected as a digital voltage. Thus, the avalanche output voltage comprises a digital avalanche output voltage indicating an avalanche of the photodiode.

(2) Create and readout an analog voltage proportional to the time interval between an incident photon arrival and a globally distributed clock. Thus, the analog avalanche output voltage is proportional to a time interval between a clock signal and an avalanche of the photodiode.

(3) Create an analog voltage proportional to the number of photon arrivals in a time between subsequent pixel readout. Thus the analog avalanche output voltage is proportional to a count of avalanches of the photodiode in a set time interval.

A source follower and row address/access transistor may be employed to readout the analog voltages from the pixel. Such a circuit is used for the first mode and the second mode where an analog voltage is read ((2) and (3) above) and may be implemented separately or shared as the different modes are not required simultaneously (at different times once the bias voltage Ve has been adjusted to place the photodiode in different modes).

A time to voltage circuit (usually linear), commonly referred to as a time to analog converter TAC, may be used to provide the analog avalanche output voltage proportional to a time interval between a clock signal and an avalanche of the photodiode. This may be implemented as a current source and a capacitor with a start/stop switch generating a ramp voltage. The implementation of the TAC may be inside the pixel as shown in FIG. 1 or may be placed outside the pixel with only the start-stop switch implemented within the pixel to sample the externally generated ramp.

An analog counter circuit may be used to generate a voltage that is proportional (usually linear but may be logarithmic) to the number of pulses from the SPAD. Thus analog avalanche output voltage is proportional to a count of avalanches of the photodiode in a set time interval. This may be implemented as shown in FIG. 1 as an in-pixel current source with an integrating capacitor. In that case the analog avalanche output voltage is read from the capacitor.

A digital output may be used for buffering the SPAD directly to the output or memorizing that the SPAD has detected a photon in the last time interval. Digital output circuitry thus operates, in the second mode, to buffer a digital avalanche output voltage. This may use a transistor with source tied to the same voltage as the reset of the SPAD anode and an external column load transistor. The memory function can be implemented by putting Rst low in which case the SPAD will pulse once to a high voltage and maintain that state until readout or a subsequent pulse on Rst. In the case, where Rst is a fixed DC bias, the SPAD will exhibit repeated pulse cycles for each photon which may be either counted or timed externally by the proposed digital output buffer path.

Figure 7:
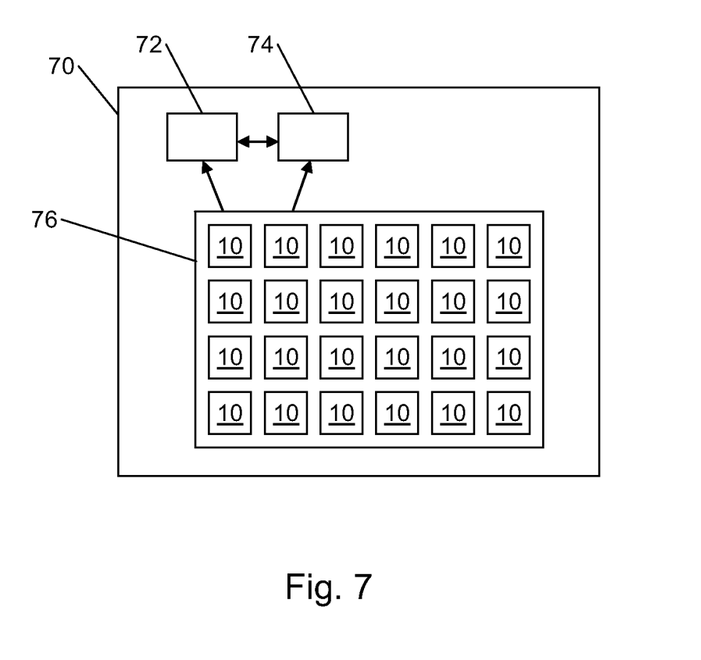
FIG. 7 illustrates an imaging device comprising an image sensor with a plurality of photodetector pixels.

FIG. 7 illustrates an imaging device, in this embodiment a camera. Other imaging devices may include, but are not limited to, medical imaging devices, fluorescence lifetime imaging devices or mobile devices such as telephones. The camera has a housing 70 that supports a memory 72, a processor 74 and an image sensor 76 coupled to at least one of the memory 72 and processor 74. The image sensor 76 comprises a plurality of photodetectors 10 as described above with reference to FIGS. 1 to 6.

While this detailed description has set forth some embodiments of the present invention, the appended claims cover other embodiments of the present invention which differ from the described embodiments according to various modifications and improvements. For example, NMOS only processing may be used so the SPADs and NMOS elements can share the NISO (N isolation) well. The bias of this well is Ve and can be adjusted dependent on the mode required.

What is claimed is:

1. A photodetector, comprising:
a photodiode;
a bias terminal operable to receive an excess bias voltage and to set a bias voltage across the photodiode;
reset circuitry operable to control the bias voltage; and
output circuitry operable to read a voltage that depends on photons incident on the photodiode,
wherein the photodetector is operable in a first mode as an integrating sensor with the bias voltage being set below the breakdown voltage of the photodiode and with the output circuitry operable to read an analog integration output voltage from the photodiode; and
wherein the photodetector is operable in a second mode as a single photon avalanche detector with the bias voltage being set above the breakdown voltage of the photodiode and with the output circuitry operable to read an analog avalanche output voltage responsive to timing of avalanches of the photodiode; and
a current source coupled between the photodiode and a capacitor;
wherein, in the second mode, the analog avalanche output voltage is read from the capacitor.

2. The photodetector according to claim 1, further comprising analog to digital converter circuitry configured to convert the analog avalanche output voltage to a digital avalanche output voltage indicating an avalanche of the photodiode.

3. The photodetector according to claim 2, further comprising digital output circuitry operable, in the second mode, to buffer the digital avalanche output voltage.

4. The photodetector according to claim 1, wherein the analog avalanche output voltage is proportional to a time interval between a clock signal and an avalanche of the photodiode.

5. The photodetector according to claim 1, wherein the analog avalanche output voltage is proportional to a count of avalanches of the photodiode in a set time interval.

6. The photodetector according to claim 1, wherein, in the first mode, the reset circuitry is operable as a switch to reset the bias voltage after an integration period.

7. The photodetector according to claim 1, wherein, in the second mode, the reset circuitry is operable as a switch to actively quench an avalanche by reducing the bias voltage to below the breakdown voltage.

8. The photodetector according to claim 7, wherein, in the second mode, the reset circuitry is further operable to arm the photodiode by resetting the bias voltage above the breakdown voltage.

9. The photodetector according to claim 1, wherein, in the second mode, the reset circuitry is operable as a load to passively quench an avalanche by reducing the bias voltage to below the breakdown voltage.

10. The photodetector according to claim 1, wherein the reset circuitry is a transistor.

11. A photodetector, comprising:
a photodiode;
a bias terminal operable to receive an excess bias voltage and to set a bias voltage across the photodiode;
reset circuitry operable to control the bias voltage; and
output circuitry operable to read a voltage that depends on photons incident on the photodiode,
wherein the photodetector is operable in a first mode as an integrating sensor with the bias voltage being set below the breakdown voltage of the photodiode and with the output circuitry operable to read an analog integration output voltage from the photodiode;
wherein the photodetector is operable in a second mode as a single photon avalanche detector with the bias voltage being set above the breakdown voltage of the photodiode and with the output circuitry operable to read an analog avalanche output voltage responsive to timing of avalanches of the photodiode; and
wherein the output circuitry comprises separate circuitry to read the integration output voltage from the photodiode in the first mode and to read the analog avalanche output voltage in the second mode.

12. The photodetector according to claim 1, wherein the output circuitry comprises shared circuitry both to read the integration output voltage from the photodiode in the first mode and to read the analog avalanche output voltage in the second mode.

13. The photodetector according to claim 11, wherein the analog avalanche output voltage is proportional to a time interval between a clock signal and an avalanche of the photodiode.

14. The photodetector according to claim 11, wherein the analog avalanche output voltage is proportional to a count of avalanches of the photodiode in a set time interval.

15. The photodetector according to claim 11,
wherein, in the first mode, the reset circuitry is operable as a switch to reset the bias voltage after an integration period; and
wherein, in the second mode, the reset circuitry is operable as a switch to actively quench an avalanche by reducing the bias voltage to below the breakdown voltage.

16. The photodetector according to claim 15, wherein, in the second mode, the reset circuitry is further operable to arm the photodiode by resetting the bias voltage above the breakdown voltage.

17. The photodetector according to claim 11, wherein, in the second mode, the reset circuitry is operable as a load to passively quench an avalanche by reducing the bias voltage to below the breakdown voltage.

18. A photodetector, comprising:
a photodiode;
a bias terminal operable to receive an excess bias voltage and to set a bias voltage across the photodiode;
reset circuitry operable to control the bias voltage; and
output circuitry operable to read a voltage that depends on photons incident on the photodiode,
wherein the photodetector is operable in a first mode as an integrating sensor with the bias voltage being set below the breakdown voltage of the photodiode and with the output circuitry operable to read an analog integration output voltage from the photodiode;
wherein the photodetector is operable in a second mode as a single photon avalanche detector with the bias voltage being set above the breakdown voltage of the photodiode and with the output circuitry operable to read an avalanche output voltage; and
wherein at least part of the output circuitry is coupled to the photodiode and operable in the first mode as a source follower to read the integration output voltage from the photodiode and operable in the second mode as a gate to produce the avalanche output voltage.

19. The photodetector according to claim 18, wherein the analog avalanche output voltage is proportional to a time interval between a clock signal and an avalanche of the photodiode.

20. The photodetector according to claim 18, wherein the analog avalanche output voltage is proportional to a count of avalanches of the photodiode in a set time interval.

21. The photodetector according to claim 18,
wherein, in the first mode, the reset circuitry is operable as a switch to reset the bias voltage after an integration period; and
wherein, in the second mode, the reset circuitry is operable as a switch to actively quench an avalanche by reducing the bias voltage to below the breakdown voltage.

22. The photodetector according to claim 21, wherein, in the second mode, the reset circuitry is further operable to arm the photodiode by resetting the bias voltage above the breakdown voltage.

23. The photodetector according to claim 18, wherein, in the second mode, the reset circuitry is operable as a load to passively quench an avalanche by reducing the bias voltage to below the breakdown voltage.

24. A photodetector, comprising:
a photodiode and output circuitry, said photodetector being operable in at least two modes including:
a first mode as an integrating sensor wherein a bias voltage across the photodiode is set below the breakdown voltage of the photodiode and the output circuitry is configured to read an analog integration output voltage from the photodiode; and
a second mode as a single photon avalanche detector wherein the bias voltage across the photodiode is set above the breakdown voltage of the photodiode and the output circuitry is configured to read an avalanche output voltage;
wherein the output circuitry comprises separate circuitry to read the integration output voltage from the photodiode in the first mode and to read an analog avalanche output voltage in the second mode.

25. The photodetector according to claim 24, wherein the output circuitry comprises shared circuitry both to read the integration output voltage from the photodiode in the first mode and to read an analog avalanche output voltage in the second mode.

26. The photodetector according to claim 24, further comprising reset circuitry operable to control the bias voltage across the photodiode.

27. The photodetector according to claim 26, wherein, in the first mode, the reset circuitry is operable as a switch to reset the bias voltage after an integration period.

28. The photodetector according to claim 26, wherein, in the second mode, the reset circuitry is operable as a switch to actively quench an avalanche by reducing the bias voltage to below the breakdown voltage.

29. The photodetector according to claim 28, wherein, in the second mode, the reset circuitry is further operable to arm the photodiode by resetting the bias voltage above the breakdown voltage.

30. The photodetector according to claim 26, wherein, in the second mode, the reset circuitry is operable as a load to passively quench an avalanche by reducing the bias voltage to below the breakdown voltage.

* * * * *